United States Patent [19]
Kurei et al.

[11] 3,936,843
[45] Feb. 3, 1976

[54] CAMERA WITH OPTIONALLY OPERABLE MANUAL CONTROLS

[75] Inventors: Hiroshi Kurei, Kawagoe; Fumio Urano, Omiya; Katsuhiko Nomura, Kawagoe, all of Japan

[73] Assignee: Asahi Kogaku Kogyo Kabushiki Kaisha, Tokyo, Japan

[22] Filed: Dec. 18, 1973

[21] Appl. No.: 425,807

[30] Foreign Application Priority Data
Dec. 30, 1972 Japan.................................. 48-456
Dec. 30, 1972 Japan.................................. 48-457

[52] U.S. Cl................... 354/51; 354/60 R; 354/156
[51] Int. Cl.².......................................... G03B 7/08
[58] Field of Search.................... 354/51, 60 R, 156

[56] References Cited
UNITED STATES PATENTS

| | | | |
|---|---|---|---|
| 3,712,192 | 1/1973 | Ono et al. | 354/51 |
| 3,756,131 | 9/1973 | Kuramoto et al. | 354/51 |
| 3,791,277 | 2/1974 | Kobori et al. | 354/51 |
| 3,831,180 | 8/1974 | Tsujimoto | 354/51 |

*Primary Examiner*—Robert P. Greiner
*Assistant Examiner*—Russell E. Adams, Jr.
*Attorney, Agent, or Firm*—Steinberg and Blake

[57] ABSTRACT

A single lens reflex camera which measures internally-received light and which has a circuit for automatically determining exposure time and including a capacitor which stores an electrical quantity corresponding to the amount of received light, this capacitor being connected to a light-measuring device through an automatic switch. The latter switch normally opens automatically in connection with swinging up of the mirror of the camera just prior to exposure so that the capacitor will store an electrical quantity corresponding to the measured light. The operator of the camera can optionally operate a manually operable structure for manually opening the latter switch, and this manually operable structure may also be connected with a power switch closed in order to render the automatic circuit operative just prior to manual opening of the switch connected to the memory capacitor, an additional power switch being provided as is conventional to be operated by manipulation of the shutter-tripping plunger. In addition it is possible to utilize the manual controls for swinging the mirror up to an exposure position just subsequent to the manual opening of the switch connected to the capacitor, and either of these structures for manual swinging up of mirror and closing of the additional power switch may be used separately without the other.

8 Claims, 6 Drawing Figures

CAMERA WITH OPTIONALLY OPERABLE MANUAL CONTROLS

BACKGROUND OF THE INVENTION

The present invention relates to cameras.

More particularly, the present invention relates to single lens reflex cameras provided with circuits for automatically determining the exposure time.

Cameras of this type normally include an internal light-receiving element for measuring the received light. Because the light is directed to the light-measuring means by a swingable mirror, which prevents light from reaching the film, this mirror must be swung up to an exposure position just prior to exposure so that the light can reach the film, and as a result the light-measuring means no longer receives light. Therefore it is necessary to retain an electrical quantity corresponding to the light which is measured, and for this purpose it is conventional to utilize a memory capacitor connected to the light-measuring means through a switch, the latter switch being automatically opened in connection with upward swinging of the mirror so that the memory capacitor will then retain the electrical quantity corresponding to the measured light. Of course, it is also possible to interrupt the travel of light to the light-measuring means by displacing the latter out of the light path, but this arrangement also necessitates memorizing an electrical quantity corresponding to the light input information at the time immediately prior to opening of the shutter until the time when the shutter starts closing.

As is well known, photographs are made under conditions which vary over a wide range. Under certain undesirable conditions the object which is to be photographed is situated in an environment where a bright light is located behind the object to be photographed, known as back-lighting or counter light, or it may be desired to photograph an object which is illuminated by spot light so that the field in which object is located is dark, with the object itself being brightly illuminated by the spot light. However, there are other conditions where for special effects or for any other purpose the photographer may wish intentionally to change the exposure which otherwise would be automatically determined. Thus, it is recognized that there are conditions where it is necessary to correct or at least change the exposure which otherwise would be provided by the automatic circuitry of the camera.

For the latter purposes a memory device such as the above memory capacitor can be conveniently used. For example when photographing a back-lighted object a camera provided with a memory capacitor of the above type can first be directed to a relatively dark area, and a manual memory switch can be set by the operator in a memory mode in order to memorize the light input from the relatively dark area. Then it is possible to provide an exposure obtained on the basis of the memorized light input when the camera is directed to the object which is situated in front of a brightly illuminated field, provided that the diaphragm aperture size and film speed are maintained unchanged. Thus, under these conditions an exposure correction can be carried out.

However, in order for the memory capacitor to operate it is necessary that the circuit in which it is located is energized, and for this purpose such a circuit has a power switch which must be closed so that the circuitry will render the capacitor operative to receive the electrical quantity which is to be memorized. In general, automatic electric circuits for controlling a camera shutter are battery powered, so that in order to save the energy of the battery and give the latter the longest possible operating life, the power switch for rendering the circuit operative is closed for the minimum amount of time. Normally when the manually operable shutter-tripping plunger is depressed, the initial part of the movement thereof will close the power switch so that the entire automatic circuitry is only turned on just prior to actual exposure in response to the movement of the shutter-tripping plunger through its initial increment of movement.

With such a camera which includes such a power switch, it is essential that the manual memory operations be carried out after the power switch is closed by depressing the shutter-tripping plunger at least partially. These operations are extremely delicate and complicated so that erroneous operation easily results under these conditions.

An additional example of conditions where it is desired to open the circuit to the memory capacitor manually is in connection with the use of single lens reflex cameras for microscopic or copying photography. Single lens reflex cameras are highly effective for purposes of this latter type because of the unique devices which are incorporated into single lens reflex cameras. However, it is extremely important when making photographs of this latter type to eliminate any blur in the resulting photograph, and from this standpoint a single lens reflex camera is disadvantageous in that when the mirror is automatically swung to its exposure position, an instant before actual exposure of the film unavoidable vibrations are created in the camera with the danger of blurring of the exposure which is received on the film.

Of course, this latter problem has been recognized. Conventionally in order to avoid this drawback a camera is provided with a manually operable structure for manually placing the mirror in its exposure position where it is swung up from its normal position inclined downwardly across the optical axis. The manual placing of the mirror in its upper exposure position is also conventional when utilizing a lens system having a short focal length.

However, while it is indeed possible for an operator to place the mirror manually in its upper exposure position, this operation is achieved at the sacrifice of automatic determination of the exposure time. Thus, with cameras which automatically determine exposure time it is essential that the light which is reflected from the mirror be measured in order to determine the exposure time. This measuring of the light reflected from the mirror must take place immediately before exposure when the mirror is swung up and the diaphragm is stopped down so as to provide an automatic accurate determination of exposure time. Under conditions where the mirror is manually swung up such automatic exposure controls cannot be achieved because the light can no longer reach the light-measuring means which provides the electrical quantity which is used as one of the factors in determining the exposure time.

SUMMARY OF THE INVENTION

It is accordingly a primary object of the present invention to provide a camera which will avoid the above drawbacks.

In particular, it is an object of the present invention to provide a camera with a construction which will enable the circuitry to be closed in a highly convenient manner prior to manual opening of a switch connected to the memory capacitor when it is desired to make corrections for special photographing conditions.

Thus, it is an object of the invention to provide an improved relationship between the power switch of the electrical circuitry and the manually operable memory switch.

Moreover, it is an object of the present invention to achieve this latter objective while still maintaining the conventional power switch arrangement and the automatic operation of the memory capacitor in connection with the swinging of the mirror.

Furthermore, it is an object of the invention to achieve these latter results without sacrificing the energy of the battery.

Furthermore, it is an object of the present invention to provide a construction according to which a power switch of the electrical circuitry will be automatically closed when the operator seeks manually to open the connection between the light-measuring means and the memory capacitor, so that the operator need not be concerned with any special manipulations in connection with carrying out corrections of the exposure.

In addition it is an object of the present invention to provide a construction of the above type which makes it possible to displace the mirror of the camera to its upper inoperative or exposure position out of the path of light traveling to the film without, however, doing away with the possibility of achieving a fully automatic exposure time.

Thus, it is an object of the present invention to provide a construction which will enable the switch between the light-measuring means and the memory capacitor to be opened manually just prior to manual swinging of the mirror to its exposure position, so that in this way the mirror is securely located in its exposure position prior to tripping and opening of the shutter with the quantity corresponding to the intensity of the light being properly stored so that an exposure can be made without risking the possibility of camera vibrations which will result in a blurred photograph.

Furthermore, it is an object of the invention to provide a construction capable of achieving these latter objectives without the use of any special warning devices which are arranged to lock the shutter button and without requiring a mechanism to operate in association with the manual swinging of the mirror to its exposure position in order to switch over from automatic to manual exposure controls. In other words with the present invention it is possible to achieve the advantage of fully automatic exposure control even under conditions where the mirror is manually placed in its upper inoperative position.

According to the invention the camera has a circuit for automatically determining the exposure time. A light-measuring means is provided for measuring the light internally of the camera, a capacitor means is provided for memorizing an electrical quantity corresponding to the measured light, and a switch means is connected between the capacitor means and the light-measuring means for transmitting the electrical quantity corresponding to the measured light from the light-measuring means to the capacitor means when the switch means is in its closed position. This switch means normally is automatically opened in connection with upward swinging of the mirror to its exposure position, just prior to exposure of the film. However, according to the present invention a manually operable means is accessible to the operator for manually opening the latter switch means so that after the light has been measured and transmitted to the capacitor the opening of the switch means will enable the capacitor to retain the electrical quantity corresponding to the measured light. An additional means is operatively connected to the manually operable means to be operated thereby for facilitating the operation of the camera. Thus, the camera according to one embodiment of the invention may include a pair of parallel-connected power switches one of which normally operates in response to depression of the shutter-tripping plunger and the other of which is closed by the above additional means which is operated by the manually operable means, the closing of this other power switch means taking place just prior to manual opening of the switch interconnecting the light-measuring means and the capacitor means by manipulation of the manually operable means. In this way it is possible very conveniently to close and energize the entire circuitry when a correction is to be made for special conditions examples of which have been referred to above. The additional means which is operated by the manually operable means may also be operatively connected with the mirror of the camera for swinging the latter up to its exposure position just after manipulation of the manually operable means for opening the switch connected between the capacitor and the light-measuring means. Thus in this case the mirror will be manually placed in its exposure position so that undesirable vibrations of the camera can be avoided during exposure of the film. Of course, both of these structures to be operated by the additional means can be combined, or they may be separately provided.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
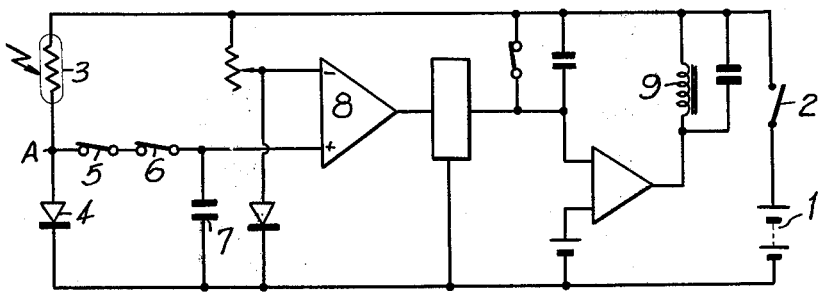
FIG. 1 is a wiring diagram illustrating one possible circuit for achieving automatic determination of exposure time.

Referring to FIG. 1, illustrated therein is a wiring diagram of an automatic exposure control circuit to be used with a single lens reflex camera. The circuit of FIG. 1 is capable of automatically determining the exposure time and includes a power source 1 for energizing the entire circuit. The circuit includes a light-receiving means 3 in the form of a suitable photosensitive element such as a cadmium sulfide resistor or the like, providing a voltage in accordance with the light intensity as is well known. Thus, an inclined mirror which extends across the optical axis behind the objective for directing an image of the object to be photographed to the viewfinder also directs light to the light-measuring means 3. This light-measuring means 3 is connected in series with a logarithmic compression element 4, in the form of a suitable diode.

The construction of the light-receiving means 3 is such that its resistance varies in according with an exponential function with variation of the light input, and thus the voltage $V_{BV}$ at the point A will vary linearly. This voltage $V_{BV}$ is fed to memory capacitor means 7 of the illustrated circuit as well as to an operational amplifier 8 by way of a switch means 5,6. The switch means 5,6 includes an automatic switch 6 and a manual switch 5 connected in series with the automatic switch 6. The automatic switch 6 is operated in a known way in connection with swinging up of the mirror just prior to exposure while the manual switch 5 is capable of being manually opened in a manner described in greater detail below. Thus, during electrical connection between the capacitor 7 and the light-sensitive means 3 the switch means 5,6, is closed.

The information from the junction A is delivered to the operational amplifier 8 through the switch means 5,6 at one of the input terminals of the amplifier 8. The other input terminal thereof receives a voltage $V_{(AV-SV)}$ which is determined in accordance with the selected diaphragm setting and the film speed.

During normal exposures in order to obtain automatically the exposure time, the automatic switch 6 opens in a fully automatic manner in association with a series of operations in response to swinging up of the mirror in response to depression of the shutter-tripping plunger with the automatic stopping down of the diaphragm also taking place. Thus, the light input information at the instant of automatic opening of the switch means 5,6, by opening of the automatic switch 6 thereof is stored in the memory capacitor means 7 as the voltage $V_{BV}$, and the operational amplifier 8 performs a calculation according to which $V_{TV}=V_{BV} - (V_{AV} - V_{SV})$ without being influenced in any way by the variation in the light input due to the subsequent operations of the diaphragm and the mirror. Depending upon the result of this latter automatic calculation by the amplifier 8 a magnet 9 which normally keeps the trailing curtain from closing the shutter in a well known manner is deenergized so that the trailing curtain is released to run down and close the shutter, thereby terminating the exposure.

Figure 2:
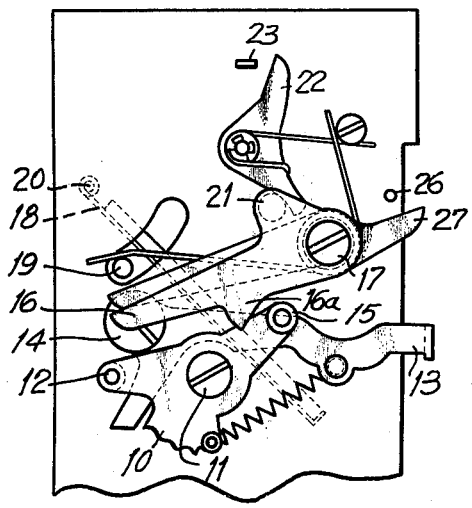
FIG. 2 is a schematic fragmentary side elevation of a mirror box and the structure carried thereby for controlling the mirror.

FIG. 2 illustrates schematically a swingable mirror situated in a mirror box, one wall of which is fragmentarily shown in FIG. 2 carrying the control structure situated at the outside of the box and carried by the wall thereof which is illustrated in FIG. 2. Thus, as may be seen from FIG. 2, a stationary pin 11 serves to support for rotary movement a lever 10 which, when the shutter is cocked and the film is advanced, in a well known manner, is turned also in a well known manner in opposition to the illustrated spring, in a clockwise direction, as viewed in FIG. 2, so as to be in the illustrated position where it is maintained ready to be released for turning in a counterclockwise direction around the pin 11, as viewed in FIG. 2, in response to depression of the shutter-tripping button. Thus, when the shutter is to be tripped the operator will depress the shutter-tripping plunger, and as a result the lever 10 will be released to the force of the spring shown in FIG. 2 operatively connected therewith, to be swung in a counterclockwise direction around the pin 11. A roller 12 which is carried by the lever 10 engages a downwardly directed arm of a lever 13 which is supported for turning movement on a stationary pin 14. The lever 13 actuates at its right end, as viewed in FIG. 2, a well known mechanism for stopping the diaphragm down to the preselected aperture. Thus, the lever 13 will also swing in a counterclockwise direction around the pin 14, as viewed in FIG. 2, for this purpose.

The lever 10 also carries a roller 15 which engages a projection 16a of a lever 16 supported for swinging movement on a stationary pin 17 which is carried by the wall of the mirror box which is shown in FIG. 2. The result is that the lever 16 will be swung in a clockwise direction around the pin 17, and a frame 18 which carries the mirror which is supported for movement around the horizontal rod 20 carries a projection 19 which extends through the illustrated curved slot and which is acted upon by the illustrated wire spring which is coiled around the pin 17. The projection 19 is situated in the path of swinging movement of the lever 16 so that the latter engages the projection 19 and swings the mirror around the pin 20 in a counterclockwise direction up to an exposure position where the mirror no longer is downwardly inclined across the optical axis. As is well known in the art, in the position of the mirror which is shown in FIG. 2, as well as in FIG. 3, the light traveling through the objective along the optical axis will reach the mirror and be reflected upwardly thereby to the viewfinder as well as to the light-measuring means 3.

While the lever 16 thus swings in a clockwise direction around the pin 17 in order to swing the mirror up to its exposure position, a pin 21 which is fixed to and projects from the lever 16 engages and turns a shutter-tripping lever 22. This lever 22 is supported for swinging movement also on a pin carried by the wall of the mirror box shown in FIG. 2, and the illustrated spring in FIG. 2 urges the lever 22 in a clockwise direction so as to maintain it in engagement with the pin 21. Situated in the path of swinging movement of the lever 22 is an element 23 which may be a pawl holding the cocked leading curtain of the shutter in its cocked position where the shutter is still closed. However, when the lever 22 is swung by the lever 16 into engagement with the pawl 23, the latter is turned in a well known manner so as to release the leading curtain, and thus the leading curtain runs down to its position where the shutter will be opened inasmuch as the trailing curtain still remains in the cocked position, held at this time by the energized electromagnet 9 as referred to above.

In accordance with the exposure time which is automatically determined by the circuit of FIG. 1 as described above, the magnet 9 will be deenergized so as to release the trailing curtain which now follows the leading curtain and closes the shutter to terminate the exposure. Thereafter the lever 10 which serves to initiate all of the above operations resumes its original position and the mirror frame 18 with the mirror carried thereby returns to the viewing and light-reflecting position shown in FIGS. 2 and 3, while at the same time the lever 13 returns to its initial position so that the diaphragm will be maintained in its fully open position for viewing purposes.

Figure 3:
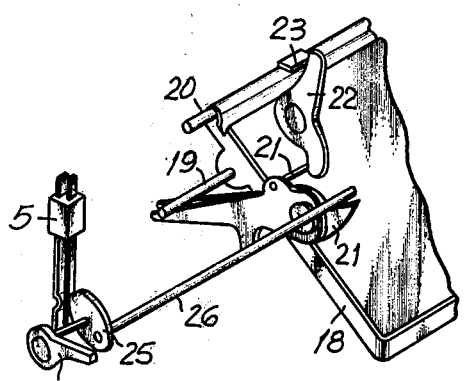
FIG. 3 is a perspective schematic illustration of a manually operable means of the invention utilized for controlling a switch and the mirror.

In a manner which is not illustrated the turning of the lever 10 is transmitted to the automatic switch 6 of the switch means 5, 6 so as to open the switch 6, in response to turning of the lever 10 in a couterclockwise direction around the pin 11, as described above, upon depression of the shutter-tripping plunger, so that at a very early stage of the turning of the lever 10 before the mirror has been swung from its light-reflecting position shown in FIGS. 2 and 3, the switch 6 has been automatically opened. Thus, the lever 10 forms an automatic means for automatically opening the automatic switch 6 during normal exposures when the shutter-tripping plunger is depressed to release the automatic means to bring about in a fully automatic manner opening of the switch 6, swinging up of the mirror, etc. Therefore, when the mirror is swung up to its exposure position even though light will no longer reach the light-measuring means 13, the quantity which corresponds to the light intensity will be stored and retained by the capacitor 7 for the purpose of automatically determining the exposure.

As has been pointed out above, for certain purposes it is highly desirable to swing the mirror up to its exposure position at an interval prior to actual exposure of the film which is great enough to prevent vibration of the camera during actual exposure of the film. This type of operation is brought about manually by way of a manually operable means 24,25 which is operatively connected with the manual switch 5 of the automatic switch means 5,6 for manually opening the switch 5. Thus, for this purpose there is accessible to the operator at the exterior of the camera a lever 24 which is carried by a suitable rod for turning movement, this rod being supported in any suitable bearings and carrying the cam 25 so that the latter necessarily turns with the lever 24.

As may be seen from FIG. 3, the switch 5 is in the form of a pair of springy blades. These blades normally assume a position spaced from each other so that the switch 5 is normally open. However, the lever 24 and the cam 25 are maintained in the rest position shown in FIG. 3 where the cam 25 holds the blades of the switch 5 in engagement with each other, so that the switch 5 remains in the closed position shown in FIGS. 1 and 3 until the operator turns the lever 24 in a clockwise direction, as viewed in FIG. 3. The cam 25 is made of an insulating material.

An additional means 26,27 is operatively connected to the manually operable means 24,25 to be operated thereby for facilitating the operation of the camera. This additional means 26,27 include the rod 26 which is fixed to the cam 25 in order to turn therewith. However, it will be noted that the rod 26 is spaced from and extends parallel to the common turning axis of the lever 24 and the cam 25. The pin 17 carries, in addition to the lever 16 referred to above, a lever 27 which is also swingable on the pin 17. This lever 27 extends to the left of the pin 17 in much the same way as the lever 16. However it also has an extension projecting to the right of the pin 17, as viewed in FIG. 2. This forward projection of the lever 27 is situated beneath the rod 26. With this construction after the operator has turned the lever 24 so as to turn the cam 25 to permit the switch 5 to assume its open position, the rod 26 and lever 27 bring about upward swinging of the mirror. Thus the rod 26 turns the lever 27 in a clockwise direction, as viewed in FIG. 2, so that the lever 27 will now engage the pin 19 and swing the frame 18 and the mirror carried thereby around the pin 20 up to the exposure position referred to above. Therefore, the sequence of the operation is such that first the switch 5 assumes its open position and then the mirror is swung by the additional means 26,27 up to its exposure position. In this way it is possible for the operator to maintain the mirror manually in its exposure position so that when the shutter is subsequently opened to make the exposure there will be no possible vibrations of the camera to result in a blurred photograph. Of course, when the switch 5 is manually opened in the manner described above the electrical quantity corresponding to the light measured by the light-measuring means 3 will be retained and stored by the capacitor means 7.

It is understood that the entire circuit shown in FIG. 1 is energized in order to render the lightmeasuring means 3 operative so that when the switch 5 is manually opened the value corresponding to light intensity will be stored by the capacitor 7. For this purpose the source of energy 1 is connected in series with a power switch 2 which is closed in order to energize the circuit shown in FIG. 1. This power switch 2 is in a well known manner closed during the initial increment of movement of the shutter-tripping plunger. Thus it is possible for the operator first to slightly depress the shutter-tripping plunger, and then while holding it in the slightly depressed position so that the switch 2 remains closed, the operator can turn the lever 24 in order to store the required light-intensity value in the capacitor 7 upon opening of the switch 5, with the mirror then swinging to its upper exposure position and being maintained in the latter position by the further turning of the lever 24 as described above. Then the operator will continue to depress the shuttertripping plunger so that the lever 10 will be released with the diaphragm being automatically stopped down as described above. Also the lever 16 will be turned in the manner described above, but at this time the mirror is already in its upper position due to the additional means 26,27, operated by the manually operable means 24,25. Therefore, under these conditions the turning of the lever 16 serves only to turn the lever 22 in order to trip the shutter as described above.

Thus, under the above circumstances when the shutter is tripped to make an exposure an optimum exposure will be achieved provided that the light-input information just prior to manual swinging up of the mirror is memorized and the selected diaphragm aperture and film speed remain unchanged.

It will be appreciated from the above that with the invention even if the mirror is manually swung up to its exposure position so that the travel of light to the light-receiving means 3 is blocked, the shutter nevertheless is automatically controlled to achieve an optimum exposure.

It will be furthermore appreciated that these results are achieved without previously known complications such as arrangements where a warning device is utilized to lock the shutter button and a mechanism is arranged to operate in association with the swinging up of the mirror in order to switch over from the automatic to the manual exposure control. Thus with the present invention it is possible to achieve the great advantage, as compared to previously known techniques, of providing an automatically determined exposure even though the mirror is manually swung up to its exposure position. Furthermore, although the automatic switch means 5,6 has been illustrated as including a separate manual switch 5 and a separate automatic switch 6 connected in series therewith, a single switch may be utilized in such a way that it is capable of being both automatically and manually operated.

Figure 4:
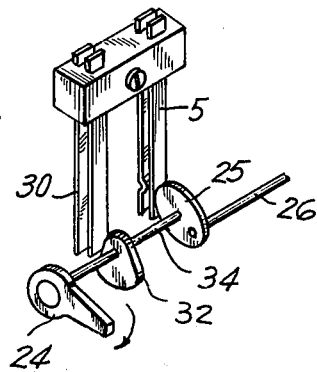
FIG. 4 is a schematic perspective illustration of how the structure of FIG. 3 may be combined with additonal structure for closing a power switch of the camera just prior to opening of the switch connected between the memory capacitor and light-measuring means.
Figure 5:
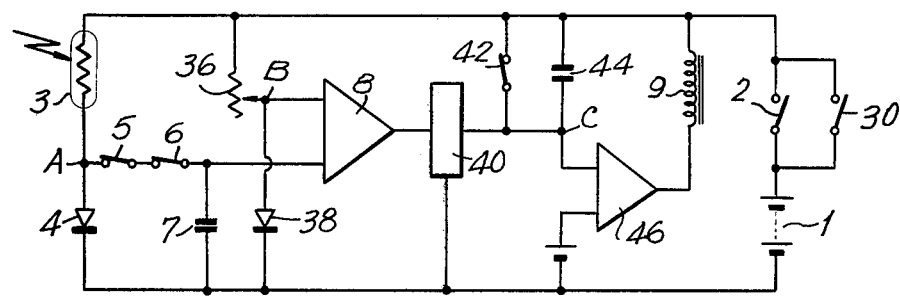
FIG. 5 is a wiring diagram illustrating how an additional power switch shown in FIG. 4 is incorporated into the circuitry.

Of course, with the above described structure of the invention there is a certain inconvenience in requiring the operator to depress the shutter-tripping plunger slightly so as to maintain the power switch 2 closed, prior to turning of the lever 24 to open the switch 5 and then swing the mirror up to its exposure position. In order to avoid this problem it is possible to provide an arrangement as shown in FIGS. 4 and 5, according to which an additional power switch 30 is connected in parallel with the power switch 2. Thus the power switch 2 can be operated in a fully conventional manner in response to depression of the shutter-tripping plunger. However, the power switch 30 may be arranged as shown in FIG. 4 so that an additional cam 32 carried by the rod 34 which extends between and is connected to the lever 24 and the cam 25 will close the switch 30 during the initial part of the turning of the lever 24. Then the switch 5 will be opened by the cam 25, and of course thereafter the rod 26 and the lever 27 will swing the mirror up to its exposure position as described above. Thus the cams 32 and 25 both of which are made of insulating material have with respect to each other an angular relationship according to which first the switch 30 is closed, thus energizing the entire circuit shown in FIG. 5 even though the switch 2 remains open, and then the switch 5 opens.

Referring to FIG. 5 it will be seen that the circuit illustrated therein includes the power switch 2 and energy source 1 as described above, the circuit also including the light-measuring means 3, the logarithmic compression diode 4, and the switch means 5,6 and capacitor means 7 as described above. Thus, the circuit which includes the series connected light-measuring means 3 and logarithmic compression element 4 is connected in parallel with the power switch 2 which in turn is connected in parallel with the additional power switch 30.

The light-measuring means 3 is in the form of a photoconductor which has an internal resistance which varies non-linearly when the light-measuring means 3 receives light reflected from the mirror, and the result is that a linear output voltage $V_{BV}$ is obtained at the point A. This output voltage is of course coupled to the memory capacitor means 7 through the switch means 5,6. However, this output voltage is also coupled with the operational amplifier 8 as described above. Accordingly, the voltage across the memory capacitor means 7 is also $V_{BV}$.

On the other hand, the selected setting of the diaphragm and the film speed, which are additional factors for determining the exposure time, are introduced by way of the variable resistor 36 having a $\gamma$-value equal to that of the photoconductor element 3. Inasmuch as the variable resistor 36 is connected to the logarithmic compression element 38, also in the form of a suitable diode, the output voltage at point B will be a linear voltage ($V_{AV}$–$V_{SV}$), and this voltage is applied to the second input of the operational amplifier 8. This operational amplifier 8 therefore performs a mathematical operation of $V_{BV}-(V_{AV}-V_{SV}) = V_V + V_{SV} - V_{AV}$. If the result of this operation is expressed by $V_{TV}$ it can be recognized that an operation according to the APEX (additive system of photographic operation) has been carried out. The voltage $V_{TV}$ varies linearly and an electric current $i_{TV}$ which corresponds to $V_{TV}$ is obtained by means of a logarithmic expansion circuit 40. After a timing switch 42 has been opened in a well known manner in synchronism with opening of the shutter, the charging of $i_{TV}$ into the timing capacitor 44 is initiated and, as a result, the potential at point C drops to the level equal to $V_B$. At this moment a differential switching circuit 46, connected to an additional voltage source which has a given level of voltage, is reversed so as to deenergize the electromagnet 9, releasing the trailing curtain so that the latter runs down and the exposure is terminated as described above in connection with FIG. 1. Thus the circuits of FIGS. 1 and 5 are substantially identical, the circuit of FIG. 5 of course including the additional power switch 30 so that a more convenient manual operation may be carried out with the circuit being automatically closed in the manner described above.

Figure 6:
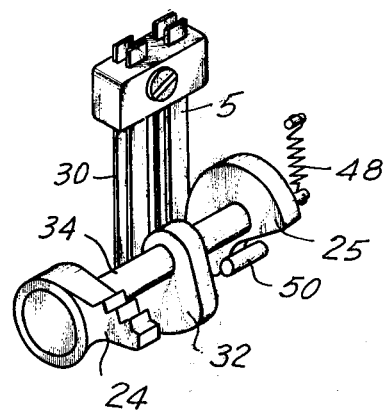
FIG. 6 illustrates schematically in a perspective view an arrangement where the manually operable means for manually opening the switch between the memory capacitor and light-measuring means is also connected through an additional means with an additional power switch, without utilizing the mirror control features of FIGS. 3 and 4.

Of course, a circuit as shown in FIG. 5 with the switches arranged as shown in FIG. 6 may be used by itself for exposure-correction purposes. Thus, as may be seen from FIG. 6 the shaft 34 extends between and is fixed to the lever 24 accessible at the exterior of the camera, the cam 32 for closing the switch 30 and the cam 25 for opening the switch 5. However, in this case there is no lever for turning the mirror up to its exposure position. Thus in the case of FIG. 6 the manually operable means 24,25 is operatively connected with the additional means 32 in order to actuate the latter to close the additional power switch 30 prior to manual opening of the switch 5 in order to store at the capacitor means 7 an electrical quantity corresponding to the light measured by the light-measuring means 3. As may be seen from FIG. 6 a spring 48 is operatively connected with the cam 25 for urging the latter into engagement with a stationary stop member 50, so that the parts will remain in the position shown in FIG. 6 unless the operator turns the lever 24 in the manner described above. This stop and spring structure may also be incorporated into the embodiment shown in FIGS. 3 and 4.

Thus, assuming that an exposure correction is required, as when the object to be photographed is backlighted or is under a spot light, then the lever 24 will be turned while the operator points the camera at an area where accurate lighting will be received. With proper lighting thus being received by the lightmeasuring means 3 the operator will turn the lever 24 in the direction of the arrow shown in FIG. 4, in opposition to the spring 48, so that first the power switch 30 is closed by the cam 32, which is made of insulating material, so that the circuit of FIG. 5 will be energized even if the switch 2 remains open. Further rotary movement of the lever 24 will result in opening of the manual switch 5 of the switch means 5,6, so that a voltage which corresponds to the light input but which is independent of subsequent light input is stored by the capacitor means 7. In this way the exposure time will be determined based upon the lighting conditions at the time when the switch 5 is manually opened, provided that the selected diaphragm aperture and film speed are maintained unchanged.

Of course, the angular position and configurations of the cams 25 and 32 are such that the switch 30 will first close and then the switch 5 will open, these cams being made of insulating material as set forth above. Moreover, although a pair of power switches 2 and 30 and a pair of switches 5,6 are illustrated, it is relatively simple to rearrange the circuit so that a single power switch and a single memory switch can be utilized both for automatic and manual memory operations.

Thus, with the embodiments shown in FIGS. 5 and 6 it is possible to provide the added power switch which is just as advantageous in conserving the power of the battery as the conventional power switch 2. As is apparent from the above, the structure of the invention is extremely convenient to operate and eliminates any possibility of errors in the operation.

It is apparent that with all of the above-described embodiments of the invention, the manually operable means 24, 25 remains in its rest position during operation of the automatic means to make normal exposures, in the event that it is not required to use the manually operable means for purposes such as compensating for unusual lighting conditions or manually turning the mirror.

What is claimed is:

1. In a camera having an electrical circuit for automatically determining exposure time, light-measuring means for measuring light and converting the measured light into a given electrical quantity, mirror means swingable between a light-reflecting position for directing light to said light-measuring means and an exposure position in which light is no longer reflected by said mirror means to said light-measuring means, capacitor means for storing said quantity, and switch means electrically connected between said capacitor means and light-measuring means for transmitting said quantity to said capacitor means when said switch means is in a closed position and for assuming an open position prior to exposure so that said capacitor means will retain and store said quantity even if light is not received by said light-measuring means at the instant of and just prior to exposure, said capacitor means, switch means, and light-measuring means forming part of said circuit, automatic means operable during normal exposures for automatically opening said switch means and displacing said mirror means to said exposure position thereof, and manually operable means accessible at the exterior of the camera and operatively connected with said switch means for manually opening said switch means at the option of the operator independently of said automatic means while the latter remains inoperative, said manually operable means remaining in a predetermined rest position when said automatic means operates during normal exposures for automatically opening said switch means and displacing said mirror means to said exposure position thereof.

2. The combination of claim 1 and additional means operatively connected between said manually operable means and said mirror means for swinging the latter up to said exposure position thereof immediately subsequent to manual opening of said switch means by said manually operable means.

3. The combination of claim 1 and wherein said circuit includes a pair of parallel-connected power switch means for closing said circuit to render the latter operative, one of said power switch means being operatively connected in said circuit for closing the latter in response to operation of the camera during normal exposures and additional means operatively connected between the other of said power switch means and said manually operable means for closing said other power switch means prior to the time when said manually operable means opens said switch means which is connected between said capacitor means and the light-measuring means.

4. The combination of claim 2 and wherein said circuit includes a pair of parallel connected power switch means one of which is operatively connected with the circuit for closing the latter during operation of the camera in connection with normal exposures and the other of which is also operatively connected to said additional means to be operated thereby for closing said circuit before the time when said manually operable means opens said switch means which is connected between said capacitor means and said light-receiving means, so that when said manually operable means is manipulated by the operator the circuit will first be closed, the switch means connected between said capacitor means and light-measuring means will then be opened, and the mirror will then be swung up to its exposure position.

5. In a camera having an electrical circuit for automatically determining exposure time, light-measuring means for measuring light and converting the measured light into a given electrical quantity, mirror means swingable between a light-reflecting position for directing light to said light-measuring means and an exposure position in which light is no longer reflected by said mirror means to said light-measuring means, capacitor means for storing said quantity, and switch means electrically connected between said capacitor means and light-measuring means for transmitting said quantity to said capacitor means when said switch means is in a closed position and for assuming an open position prior to exposure so that said capacitor means will retain and store said quantity even if light is not received by said light-measuring means at the instant of and just prior to exposure, said capacitor means, switch means, and light-measuring means forming part of said circuit, automatic means operable during normal exposures for automatically opening said switch means and displacing said mirror means to said exposure position thereof, and manually operable means accessible at the exterior of the camera and operatively connected with said switch means for manually opening said switch means at the option of the operator independently of said automatic means while the latter remains inoperative, said switch means including a pair of series-connected switches one of which is an automatic switch to be opened automatically by said automatic means and the other of which is a manual switch opened by said manually operable means, said manually operable means remaining in a predetermined rest position when said automatic means operates during normal exposures for automatically opening said switch means and displacing said mirror means to said exposure position thereof.

6. The combination of claim 5 and wherein said manual switch normally assumes an open position, said manually operable means including a rotary shaft adapted to be turned by the operator and a cam of insulating material carried by said shaft and engaging said manual switch for holding the latter in a closed position, said shaft when turned by the operator displacing said cam to a location where said manual switch assumes its open position.

7. The combination of claim 6 and wherein said mirror means includes a mirror which normally directs light to said light-measuring means and additional means operatively connected between said manually operable means and said mirror for swinging the latter up to said exposure position where light is no longer directed to said light-measuring means, and said additional means including a second shaft fixed to said cam for rotary movement therewith, said second shaft being spaced from and parallel to the first-mentioned shaft, and a lever situated in the path of movement of said second shaft to be turned thereby, said mirror having a projection situated in the path of movement of said lever so that when the latter is turned by said second shaft said lever will swing said mirror up to said exposure position thereof.

8. The combination of claim 6 and wherein the circuit includes a pair of parallel-connected power switches one of which is adapted to operate during normal exposures for closing the circuit and the other of which is normally open, and a second cam of insulating material carried by said shaft for rotary movement therewith and having on said shaft a position for first closing said other power switch prior to opening of said manual switch.

\* \* \* \* \*